(12) United States Patent
Chen et al.

(10) Patent No.: US 10,083,074 B2
(45) Date of Patent: *Sep. 25, 2018

(54) MAXIMIZING USE OF STORAGE IN A DATA REPLICATION ENVIRONMENT

(71) Applicant: International Business Machines Corporation, Armonk, NY (US)

(72) Inventors: Chiahong Chen, Oro Valley, AZ (US); John C. Elliott, Tucson, AZ (US); William G. Sherman, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 99 days.

This patent is subject to a terminal disclaimer.

(21) Appl. No.: 14/976,671

(22) Filed: Dec. 21, 2015

(65) Prior Publication Data

US 2016/0110247 A1    Apr. 21, 2016

Related U.S. Application Data

(63) Continuation of application No. 14/559,587, filed on Dec. 3, 2014, now Pat. No. 9,244,788, which is a
(Continued)

(51) Int. Cl.
*G06F 11/00* (2006.01)
*G06F 11/07* (2006.01)
(Continued)

(52) U.S. Cl.
CPC ........ *G06F 11/0793* (2013.01); *G06F 11/079* (2013.01); *G06F 11/0709* (2013.01);
(Continued)

(58) Field of Classification Search
None
See application file for complete search history.

(56) References Cited

U.S. PATENT DOCUMENTS 7,039,777 B2   5/2006   Yamagami et al.
7,613,749 B2   11/2009  Flynn, Jr. et al.
(Continued)

OTHER PUBLICATIONS

U.S. Appl. No. 13/484,789.
(Continued)

*Primary Examiner* — Yolanda L Wilson
(74) *Attorney, Agent, or Firm* — Stephen R. Tkacs; Stephen J. Walder, Jr.; Robert M. Sullivan

(57) ABSTRACT

Mechanisms for controlling access to storage volumes on the secondary storage system is provided. A determination is made as to whether a first site computing device has sent a notification of a failure condition of a first site. In response to a determination that the notification of the failure condition of the first site has not been received, secondary workloads of a second site computing device are permitted to access storage volumes on the secondary storage system. In response to a determination that the notification of the failure condition of the first site has been received, a mode of operation of the second site is modified from a normal mode of operation to a failure mode of operation. In the failure mode of operation, the storage system controller of the second site blocks at least a portion of access requests from secondary workloads of the second site computing device.

20 Claims, 6 Drawing Sheets

Related U.S. Application Data continuation of application No. 13/484,789, filed on May 31, 2012, now Pat. No. 8,918,672.

(51) Int. Cl.
  *G06F 11/20* (2006.01)
  *G06F 11/14* (2006.01)
  *H04L 29/08* (2006.01)

(52) U.S. Cl.
  CPC ...... *G06F 11/0751* (2013.01); *G06F 11/1464* (2013.01); *G06F 11/203* (2013.01); *G06F 11/2035* (2013.01); *G06F 11/2048* (2013.01); *G06F 11/2069* (2013.01); *G06F 11/2089* (2013.01); *G06F 11/2092* (2013.01); *H04L 67/1095* (2013.01); *G06F 2201/84* (2013.01); *G06F 2201/85* (2013.01)

(56) References Cited

U.S. PATENT DOCUMENTS

| | | | |
|---|---|---|---|
| 7,640,451 B2 | 12/2009 | Meyer et al. | |
| 7,739,540 B2 | 6/2010 | Akutsu et al. | |
| 7,770,064 B2 | 8/2010 | Harper et al. | |
| 7,779,298 B2 | 8/2010 | Challenger et al. | |
| 7,971,094 B1 | 6/2011 | Benn et al. | |
| 8,024,536 B2 | 9/2011 | Kaneko et al. | |
| 8,918,672 B2 | 12/2014 | Chen et al. | |
| 8,930,744 B2 | 1/2015 | Chen et al. | |
| 2004/0243709 A1 | 12/2004 | Kalyanavarathan et al. | |
| 2005/0038834 A1 | 2/2005 | Souder et al. | |
| 2005/0038835 A1 | 2/2005 | Chidambaran et al. | |
| 2005/0060608 A1 | 3/2005 | Marchand | |
| 2006/0271544 A1 | 11/2006 | Devarakonda et al. | |
| 2007/0022129 A1 | 1/2007 | Bahar et al. | |
| 2007/0192560 A1 | 8/2007 | Furuhashi | |
| 2011/0047413 A1* | 2/2011 | McGill ............... G06F 11/1662 714/15 |
| 2011/0093862 A1 | 4/2011 | Doatmas et al. | |
| 2011/0161294 A1 | 6/2011 | Vengerov et al. | |
| 2015/0082079 A1 | 3/2015 | Chen et al. | |
| 2015/0089277 A1 | 3/2015 | Chen et al. | |

OTHER PUBLICATIONS

U.S. Appl. No. 13/767,969.
U.S. Appl. No. 14/559,587.
U.S. Appl. No. 14/557,710.
"Automating High Availability (HA) Services with VMware HA", VMWare, Inc., May 29, 2007, 15 pages.

* cited by examiner

MAXIMIZING USE OF STORAGE IN A DATA REPLICATION ENVIRONMENT

BACKGROUND

The present application relates generally to an improved data processing apparatus and method and more specifically to mechanisms for maximizing the use of storage system resources in a data replication environment.

Data replication across storage systems is used to provide protection and continued access to data for disaster recovery. The primary data volumes are used for read/write access by attached host systems. Updates to the primary volumes are replicated to a set of secondary data volumes in a separate storage device/system. The storage device/systems that provide the primary and secondary data volumes are physically separate and are likely at different geographic sites. If a set of primary data volumes at a site storage device/system is unavailable for any reason, there are mechanisms to transition work from the primary data volumes to the secondary data volumes at the other site. Ideally, this transition is accomplished without impacting performance required by workloads being submitted to the primary data volumes which are now transitioned to the secondary data volumes at the alternate site. This means that the secondary storage devices/system of the alternate site is significantly under-utilized to ensure that it can meet performance requirements in the event of a failover from the primary workload.

SUMMARY

In one illustrative embodiment, a method, in a data processing system comprising a first storage system controller and a second storage system, for controlling access to storage volumes on the second storage system is provided. The method comprises determining, by the storage system controller, whether a first site computing device has sent a notification of a failover condition for accessing primary data volumes at a first site. The method further comprises, in response to a determination that the notification of the failover condition of the primary volumes at a first site has not been received, permitting, by the storage system controller, other workloads of a second site computing device to access storage volumes on the second storage system. Moreover, the method also comprises, in response to a determination that the notification of the failover condition of the first site primary volumes has been received, modifying, by the storage system controller, a mode of operation of the second site from a normal mode of operation to a failover mode of operation. In the failover mode of operation, the storage system controller of the second site blocks or lowers priority of at least a portion of access requests from local or non-critical workloads of the second site computing devices.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
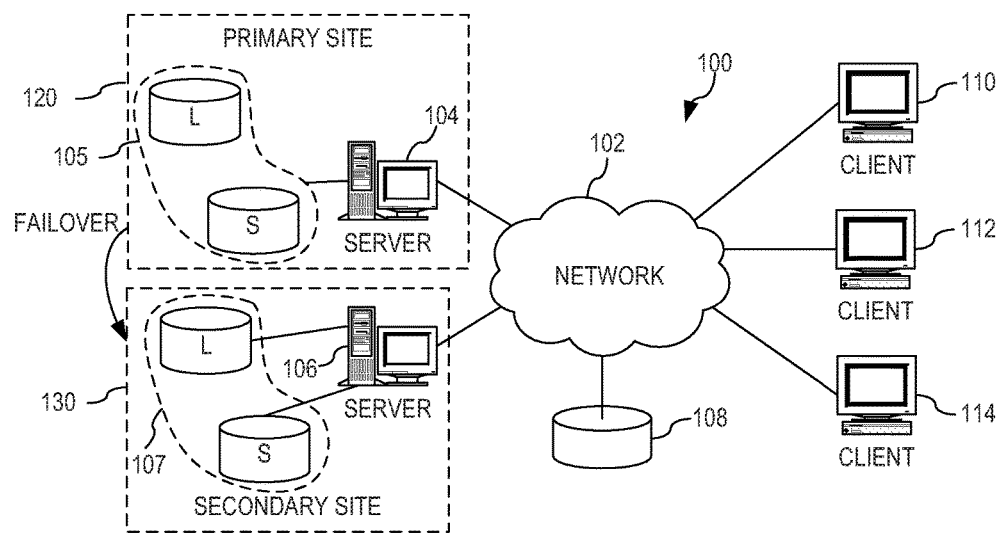
FIG. 1 is an example diagram of a distributed data processing system in which aspects of the illustrative embodiments may be implemented.

The illustrative embodiments provide mechanisms for maximizing the use of storage system resources in a data replication environment. A first site storage system provides the primary data volumes for read/write access by a set of host systems and writes replication data to a second site storage system which provides a secondary set of data volumes that store a copy of the first site primary volumes.

With the mechanisms of the illustrative embodiments, the second site storage system is configured to permit utilization of the entire second site storage system, or at least the majority of the second site storage system, during times when the second site storage system is not the target of a failover, i.e. while the first site storage system (storage system with the primary data volumes of a replication pair) is functioning in a normal, non-failover, mode of operation. Volumes on the second site storage system have associated volume attributes that specify which volumes are accessible by non-critical workloads during normal, i.e. non-failover, operation and which volumes are accessible by non-critical workloads during non-normal, i.e. failover, modes of operation. During a failover condition, the volumes that were accessible to non-critical workloads during normal operation are no longer accessible to these non-critical workloads, or at least a majority of these volumes will not be accessible to the non-critical workloads, and instead only the secondary volumes associated with the first site's primary volume workloads are accessible. Moreover, all of the resources of the second site storage system are then made available to the first site's workloads during the failover condition.

Thus, with the mechanisms of the illustrative embodiments, storage volumes in a second site storage system at a second site are provided that are only usable by non-critical workloads if the first site and the primary data volumes in the first site storage system at the first site are functioning normally, i.e. a non-failover condition. These non-critical volumes are made unavailable on failover, thereby causing all non-critical work to be halted and the system resources of the second site storage system are made available to meet the first site primary data volume workload requirements. As a result, the second site storage system is able to run a set of non-critical applications while assuring the first site storage system and first site the ability to provide full throughput to the primary data volume workloads in the case of a failover condition.

In another illustrative embodiment, rather than discontinuing all non-critical applications in the event of a failover, the mechanisms of the illustrative embodiments may transfer volume priority settings of the primary data volumes from the first site storage system to the second site storage system and apply the transferred volume priority settings to all workloads, both primary data volume workloads and second site workloads, being handled by the second site storage system. This may include merging the volume priority settings of the primary data volumes from the first site storage system with the existing volume priority settings of the volumes in the second site storage system and resolving any conflicts in the two different sets of volume priority settings.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone soft-ware package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
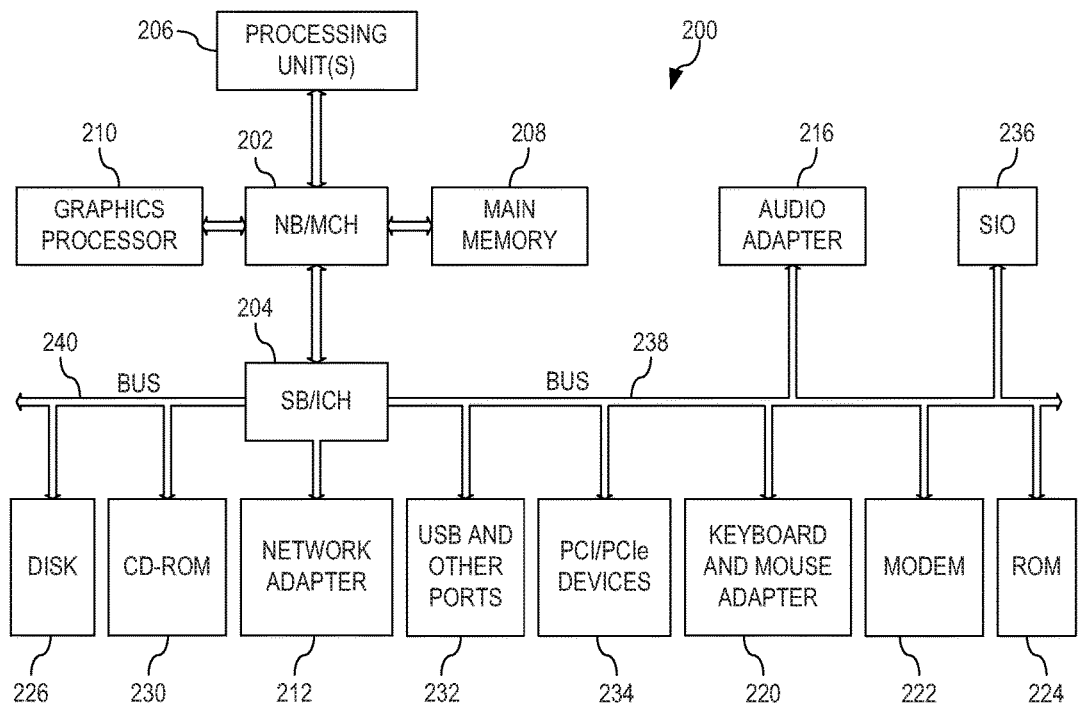
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. Furthermore, servers 104 and 106 may also have their own associated storage devices/systems 105 and 107. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® m computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

With reference again to FIG. 1, a peer-to-peer copy (PPRC) or other failover mechanism may be established between a first site A 120, e.g., server 104, and a second site B 130, e.g., server 106. The failover mechanism may cause data/applications to be replicated on both the first site A 120 and the second site B 130 during normal operation and/or in response to a detected failure or imminent failure. For example, in some failover mechanisms, the first site A 120 and second site B 130 are equipped with the same applications such that the second site B 130 may take over for the first site A 120 in the event of a failure. In other failover mechanisms, data is mirrored on both sites A and B 120, 130 such that if a write occurs to a primary volume P of a first site A 120 storage system 105, the write is mirrored to a secondary volume S in the second site B 130 storage system 107.

As mentioned above, this data replication across storage systems 105 and 107 of the first site A 120 and second site B 130 is used as a way to provide protection and continued access to the data for purposes of disaster recovery. If the primary volume P in the storage system 105 of the first site A 120 becomes unavailable for any reason, the failover mechanisms operate to transition work from the first site A 120 to the second site B 130. In known failover mechanisms, in order to make the transition of work from the first site A 120 to the second site B 130 as transparent as possible without impacting the performance required by the workloads being transitioned, the second site B 130 and its secondary volume S in the storage system 107 are typically underutilized during normal, non-failover, operation of the first site A 120 in anticipation of a possible failover event. This ensures that the second site B 130 will have the resources and be able to meet the performance requirements for handling the transitioned workloads from the first site A 120, i.e. the primary workloads, in the event of a failure of the first site A 120 or primary volume P in storage system 105. However, this means that the significant resources of the second site B 130 are not being used optimally.

The illustrative embodiments provide mechanisms for increasing the utilization of the second site B 130 and its secondary volume S in the storage system 107 during normal, non-failover, modes of operation of the first and second sites A and 120, 130 while ensuring that the second site B 130 will provide the necessary resources for handling transitioned primary workloads from the first site A 120 in the event of a failover occurring. The illustrative embodiments provide mechanisms for specifying volume attributes in the second site storage controller 150 for the local volumes L and secondary volumes S of the second site storage system 107, and priorities of workloads that permit non-critical workloads of the second site B 130 to be executed on designated local and secondary storage volumes L and S in the secondary storage 107 during non-failover conditions.

In the event of a failover from the first site A 120 to the second site B 130, these volume attributes and priorities may be utilized to control the allocation of secondary storage system 107 resources to primary and secondary workloads such that the primary workloads are allocated the required amount of resources to achieve the transition of the primary workload to the second site 130 with transparency and minimal, if any, impact to the performance of the primary workloads. In one illustrative embodiment, this may involve defining storage volumes in the secondary storage system 107 such that in the event of a failover occurring, certain storage volumes in the secondary storage system 107, such as local volume L, that are directed to handling non-critical workloads, i.e. workloads that are not part of the replication pair relationship between the primary volume P in the first site A 120 and a secondary volume S in the second site B 130, are rendered non-usable during the failover such that the resources of the second site B 130 storage system 107 are made available to the primary workloads. In other illustrative embodiments, the mechanisms of the illustrative embodiments implement the priority settings of the first site A 120 on the second site B 130 which applies them to both primary and secondary workloads. In this way, some of the non-critical workloads may still be able to be executed on a subset of the volumes in the second site B 130 storage system 107, e.g., in the local volumes L, while primary workloads are given priority to the remaining volumes, e.g., the secondary volumes S, of the second site B 130 storage system 107.

Figure 3A:
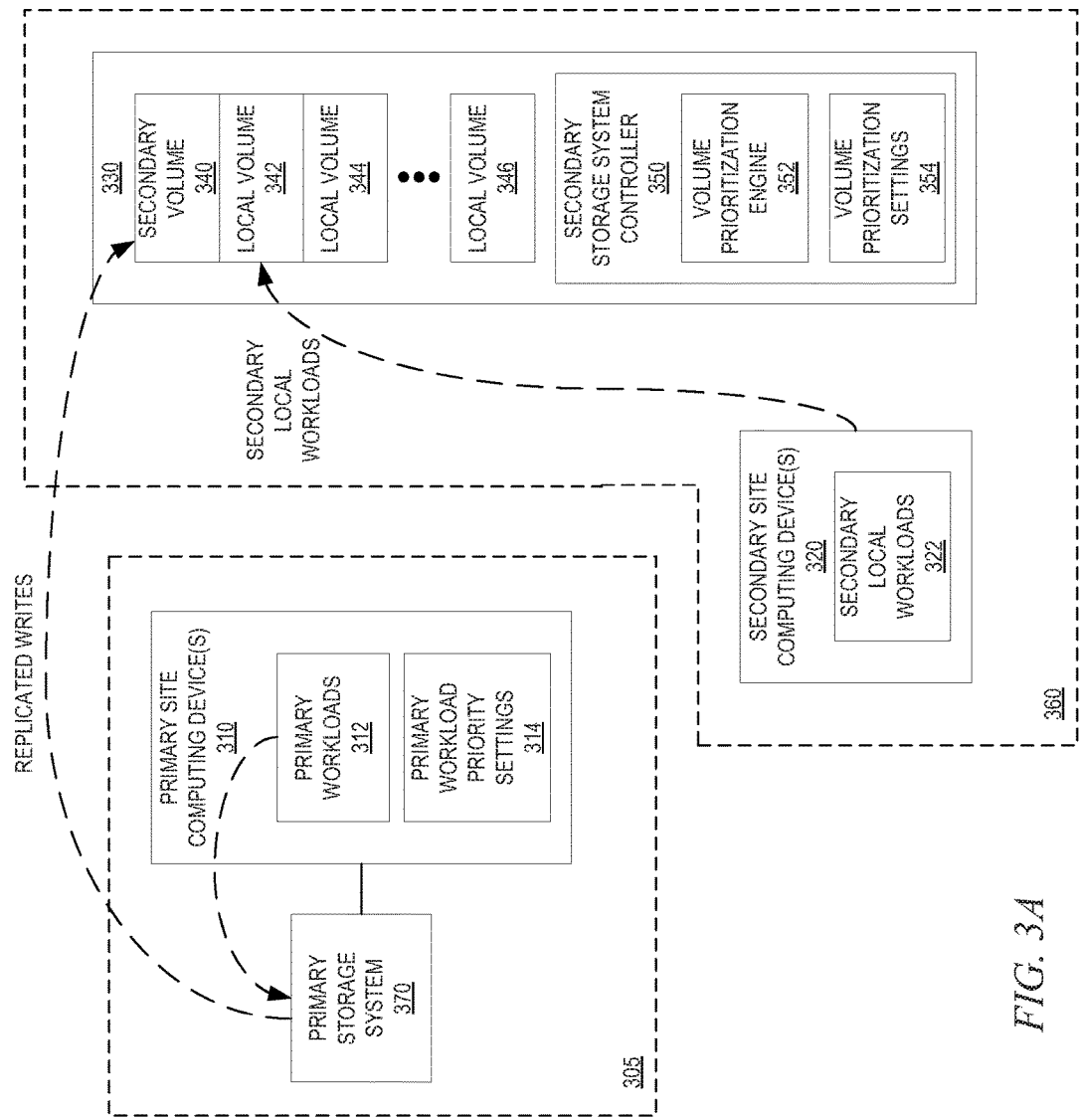
FIG. 3A illustrates the replication pair of a first site A and a second site B as part of a peer-to-peer remote copy (PPRC), or other failover mechanism, prior to a failure of the first site A in accordance with one illustrative embodiment.
Figure 3B:
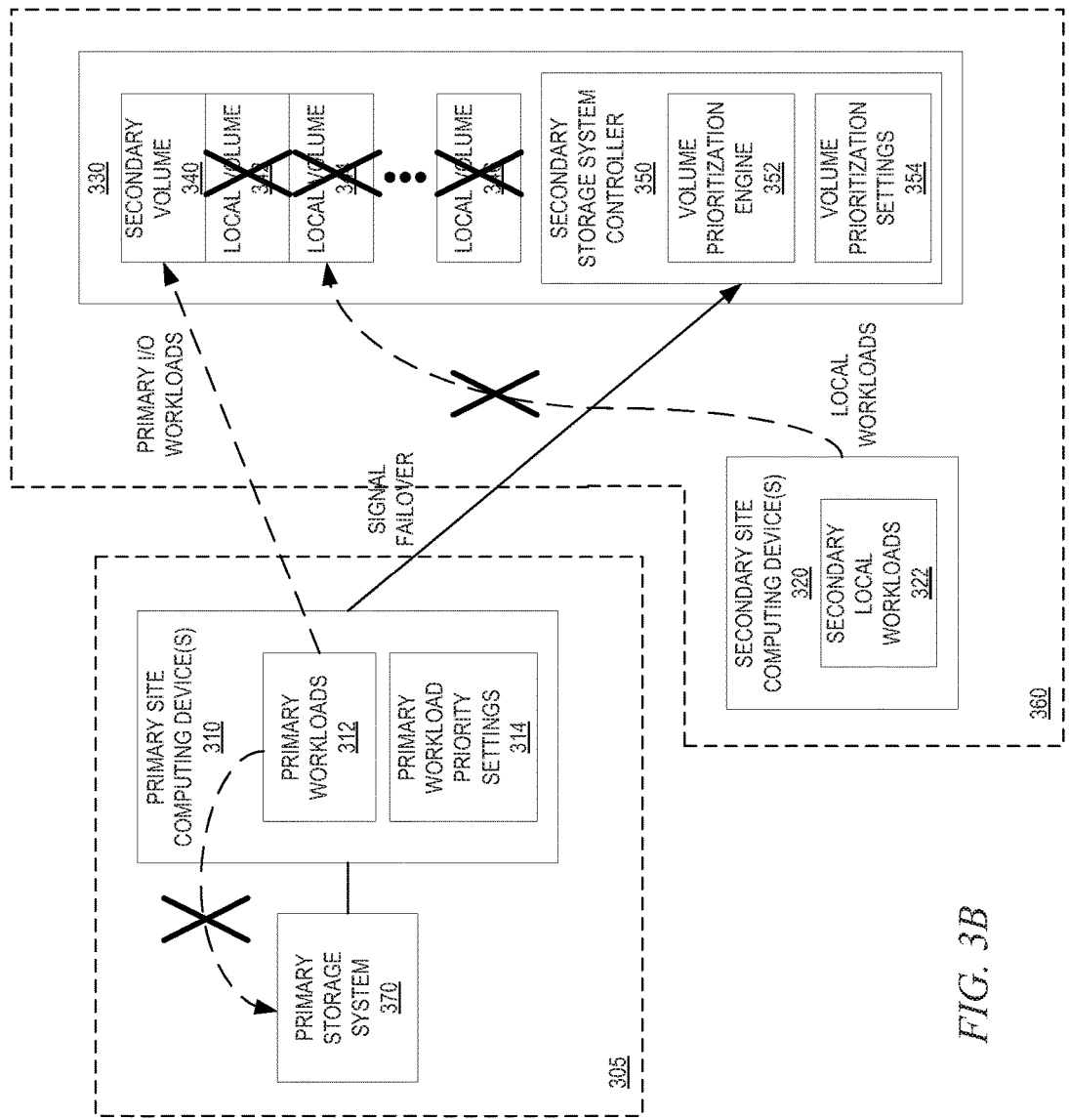
FIG. 3B illustrates the replication pair of a first site A and a second site B as part of a peer-to-peer remote copy (PPRC), or other failover mechanism, after a failure of the first site A in accordance with one illustrative embodiment.

FIGS. 3A and 3B are example block diagrams illustrating the use of failover mechanisms for increasing utilization of secondary storage systems in accordance with one illustrative embodiment. FIG. 3A illustrates the replication pair of a first site A 305 and a second site B 360 as part of a peer-to-peer remote copy (PPRC), or other failover mechanism, prior to a failure of the first site A 305 in accordance with one illustrative embodiment. Here the term "replication pair" refers to an established relationship between two sites as a first site A 305 and second site B 360 where, in the event of a failure of the first site A 305, workloads of the first site A 305 are migrated to the second site B 360 and utilize the resources of the second site B 360 Which may include a copy of the applications/data matching the applications/data of the first site A 305. Elements associated with first site A 305 are referred to herein as the "primary" elements while elements associated with the second site B 360 are referred to herein as "secondary" elements.

FIG. 3B illustrates the replication pair of a first site A 305 and a second site B 360 after a failure of the first site, in accordance with one illustrative embodiment. With a failover mechanism already in place between the first site A 305 and the second site B 360, in the event of a failover condition occurring, workloads from the first site A 305 are redirected or transitioned from the first site A 305 to the second site B 360. Such failover mechanisms are generally known in the art and thus, a more detailed explanation of the manner by which the workloads are transitioned will not be provided herein. The present application is directed to augmenting such failover mechanisms to permit maximum utilization of the secondary storage volumes of the storage system 330 of the second site B 360 during normal, non-failover, modes of operation of the first site A 305 while ensuring availability to provide sufficient resources for transparent transitioning of primary workloads from the first site A 305 in the event of a rollover condition occurring.

With reference again to FIG. 3A, the second site storage system 330 of the second site B 360 comprises a plurality of logical storage volumes 340-346 where each logical storage volume 340-346 has associated volume attributes identifying priorities specifying the priority of types of workloads that are permitted to access the logical storage volume 340-346. During normal, non-failover, modes of operation, the priorities associated with the logical storage volumes 340-346 may be set to permit non-critical workloads, e.g., local workloads 322 of the secondary site B computing devices 320, to access or be serviced by all of, or a majority of, the logical storage volumes 340-346 of the secondary site B's storage system 330 that are sufficient to handle such local workloads. This is contrary to known failover configurations in which the second site B's storage system 330 remains unused with regard to local workloads waiting for a failover condition to occur causing primary workloads to be transitioned from the first site A 305 to the secondary site B's storage system 330.

During this normal mode of operation, i.e. when the first site A 305 is not experiencing a failure condition in either the primary site computing devices 310 or in the primary storage system 370, the primary workloads 312 of the first site A 305 computing devices 310 may perform input/output (I/O) operations directed to the primary storage system 370 with data replication or mirroring occurring to one or more of the logical volumes 340-346 of the secondary storage system 330. These may be separate logical volumes, for example a secondary volume 340 in FIGS. 3A-3C, which are not accessible by local workloads 322 of the secondary site computing devices 320. That is, certain logical volumes 340 in the secondary storage system 330 may have associated volume attributes specifying that the logical volumes 340 are only accessible by primary workloads 312 from first site A 305. As a result, these logical volumes 342 only store data replicated or mirrored from the primary storage system 370 during normal modes of operation, or data modified by primary workloads 312 transitioned to the secondary storage system 330 during failover modes of operation. Other logical volumes 342-346 may have associated volume attributes indicating that these logical volumes 342-346 are accessible by local workloads 322 during normal modes of operation. As a result, these logical volumes 342-346 may store data used by local workloads 322 associated with secondary site computing devices 320.

The secondary storage system 330 comprises a secondary storage system controller 350 which includes a volume prioritization engine 352 that operates to control access of I/O operations to the various logical volumes 340-346 of the secondary storage system 330. The volume prioritization engine 352 performs such control operations based on the volume attributes associated with each of the logical volume 340-346 in the secondary storage system 330 as well as volume prioritization settings 354 of the secondary storage system 330. The volume attributes specify the priorities of workloads associated with the logical volumes 340-346. The volume prioritization settings 354 associate priorities with different workloads and may further specify hierarchies of workload priorities and/or other settings to identify how to handle workloads of various priorities with regard to access to logical volumes of associated secondary storage system 330.

That is, the volume prioritization engine 352 may store volume attributes for each of the logical volumes 340-346 in the secondary storage system 330. These volume attributes specify priority levels of workloads that are permitted to access the data stored in the corresponding logical volume 340-346 during normal operation of the first site A 305. Thus, for example, a volume attribute for logical volumes 342-346 may specify that the logical volumes 342-346 are able to be accessed by local workloads 322, while a volume attribute for logical volume 340 may specify that the logical volume 340 is not able to be accessed by local workloads 322 and instead can only be accessed by primary workloads 312 of a first site A 305. It should be appreciated that there may be various priority settings of various levels such that there may be multiple priority levels for the local workloads 322, for example. These settings essentially identify which logical volumes 340-346, if any, are able to be accessed by local workloads 322 of the second site B 360. In a simple example, the volume attributes may be of the type "critical" or "non-critical" to indicate whether the corresponding logical volumes can be accessed by non-critical secondary site workloads 322 during normal operation of the first site A 305.

In one illustrative embodiment, during normal operation, logical volumes are differentiated by those that have volume attributes of "critical" and those that are "non-critical." For those logical volumes 342-346 that have a "non-critical" volume attribute, local workloads 322 are able to utilize the resources of the second site B 360 to perform I/O operations on the data stored in these logical volumes 342-346. For those logical volumes 340 that have a "critical" volume attribute, local workloads 322 are not able to access these logical volumes and only primary workloads 312 are permitted to access these logical volumes 340. During normal operation, these primary workloads 312 may comprise peer-to-peer remote copy mirroring or data replication operations, for example. The logic of the volume prioritization engine 352 operates during normal operation based on these volume attributes and the volume prioritization settings 354 which specify that for normal operation, to permit I/O operations from local workloads 322 to logical volumes having a volume attribute of "non-critical" but to block local workloads 322 from accessing logical volumes having a volume attribute of "critical."

With reference now to FIG. 3B, in the event of a failover condition occurring in the first site A 305, a primary site computing device 310 of the first site A 305, storage controller (not shown) of the primary storage system 370, or the like, may issue a notification of the failover condition to the secondary storage system controller 350. In response to the notification of the failover condition, the volume prioritization engine 352 of the secondary storage system controller 350 may operate to block local workloads 322 from accessing data of the logical volumes 340-346 including those that have volume attributes specifying that they may be accessed by local workloads 322, e.g., logical volumes 342-346. As a result, the resources of the second site B 360, e.g., processors, buses, storage devices, etc., are not utilized by the local workloads 322 but are reserved for the primary workloads 312 being transitioned to the second site B 360 as a result of the failover condition occurring. Thus, during the failover mode of operation the secondary storage system 330 of the second site B 360 provides sufficient resources for supporting the transition of primary workloads 312 from the first site A 305 to the second site B 360. This is illustrated in FIG. 3B by dashed line from the primary computing devices 310 to the secondary storage system 330 and the "X's" over the logical volumes 342-346 which indicate that these logical volumes cannot be accessed by local workloads 322 after the failover mode of operation has been entered.

Should the failover condition be resolved, a notification may be sent from the primary site computing device 310, or storage controller of the primary storage system 370, to the secondary storage system controller 350. As a result, the mode of operation for the secondary storage system 330 may be transitioned back from a failover mode of operation to a normal mode of operation. Thus, local workloads 322 may again access logical volumes 342-346 that have volume attributes specifying a priority which the local workloads 322 may access.

Thus, in a first illustrative embodiment of the present invention, local workloads 322 of a second site B 360 may utilize the resources of the secondary storage system 330 when they are otherwise not being utilized by primary workloads 312 during normal operation of the first site A 305. However, the mechanisms of the illustrative embodiments permit a transition of this operation to a failover mode of operation in which local workloads are blocked and the full resources of the secondary storage system 330 are provided for access by the primary workloads 312 of the first site A 305. This ensures a transparent and minimal performance impact transition of the primary workloads 312 to the second site B 360 during a failover while maximizing the utilization of the second site B 360 during normal operation.

During the failover mode of operation, because the local workloads 322 are essentially blocked from accessing the logical volumes 342-346, the applications submitting the local workloads 322 may fail if they are not able to meet the response requirements of the secondary site computing devices 320. Once the failover condition has been rectified, these applications may be restarted on the secondary site computing devices 320 and local workloads 322 my then be resubmitted to the logical volumes 342-346.

Figure 3C:
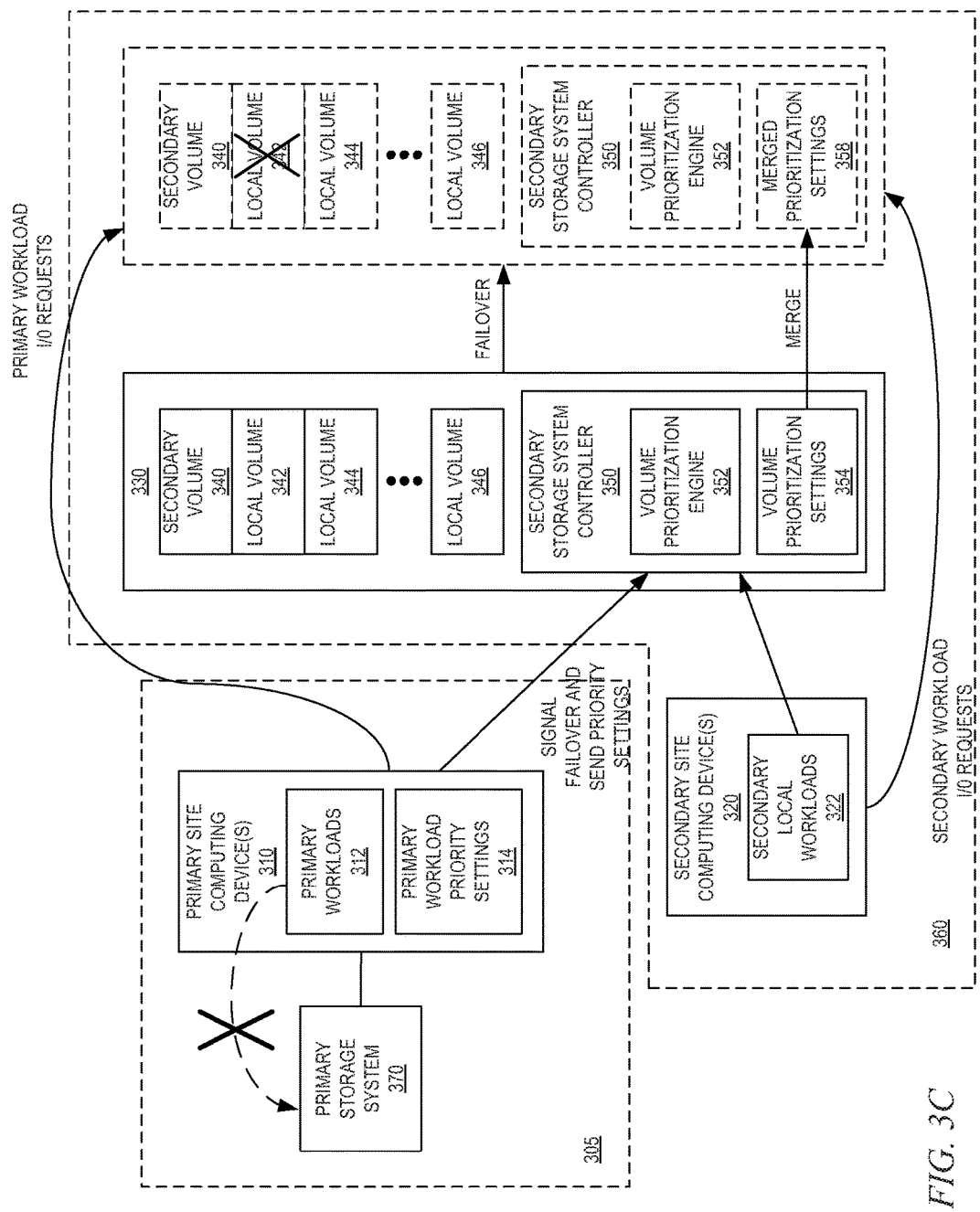
FIG. 3C is an example block diagram illustrating the use of failover mechanisms for increasing utilization of secondary storage systems in accordance with another illustrative embodiment.

FIG. 3C is an example block diagram illustrating the use of failover mechanisms for increasing utilization of secondary storage systems in accordance with another illustrative embodiment. As shown in FIG. 3C, rather than simply blocking local workloads 322 completely during the failover mode of operation, the primary workload priority settings 314 used in the first site A 305 may be transmitted to the secondary storage system controller 350 along with the notification of the failover condition having occurred. These primary workload priority settings 314 may be merged with the existing volume prioritization settings 354 of the secondary storage system 330 to generate merged prioritization settings 358. This merging may result in a combination of the primary workload priority settings 314 and the volume prioritization settings 354 of the secondary storage system 330 where any conflicts between priority settings 354 may be resolved in favor of the primary workload priority settings 314. In other illustrative embodiments, the volume prioritization settings 354 may be replaced entirely with the primary workload priority settings 314.

Based on the merged prioritization settings 358 of the secondary storage system 330, and the priority of the workloads (primary or secondary) submitting I/O requests to the secondary storage system 330, the volume prioritization engine 352 may permit or deny I/O requests access to the various logical volumes 340-346 of the secondary storage system 330. For example, certain local workloads 322 may have priorities sufficiently high to allow some resources of the secondary storage system 330 to be allocated to the local workloads 322 even when operating in a failover mode of operation. The priorities in the merged prioritization settings 358 should be established to favor primary workloads 312 over all local workloads 322. However, the priorities may be established such that some of the local workloads 322 may still have I/O requests serviced by certain ones of the logical volumes 340-346.

For example, as shown in FIG. 3C, secondary volume 340 services I/O requests from primary workloads 312 while local volumes 342 and 344 service I/O requests from local workloads 322 having a next two highest priorities below primary workload priority. A third priority level of local workloads 322 may have its I/O requests serviced by local volume 346. In accordance with the merged prioritization settings 358, a priority scheme may be defined such that the primary workload priority and the first two highest priority settings of local workloads may be permitted to access corresponding logical volumes 340-344 of the secondary storage system 330. However, in accordance with the merged prioritization settings 358, local workloads having a priority of the third priority level or lower may have their I/O requests blocked by the volume prioritization engine 352, as illustrated in FIG. 3B by the "X" over local volume 342.

In either the illustrative embodiment shown in FIG. 3A-3B or the illustrative embodiment shown in FIG. 3C, I/O requests from either the primary workloads 312 or the local workloads 322 may be received by the volume prioritization engine 352 of the secondary storage system 330. The volume prioritization engine 352 may determine whether the received I/O requests should be permitted to be processed and, as a result, access the logical volume 340-346 that is targeted by the received I/O requests. This determination may be based on the priority of the workload submitting the I/O request, the volume attributes of the volume to which the I/O request is targeted, and/or the volume prioritization settings 354, 358. With regard to the local workloads 322, during normal mode of operation, as long as the volume attributes of the targeted volume are set such that the priority level of the local workload 322 submitting the I/O request matches or exceeds the priority level specified in the volume attributes, then the I/O request is permitted to access the targeted volume. During failure mode of operation, in one illustrative embodiment, all local workload I/O requests are blocked. In another illustrative embodiment, during failure mode of operation, local workload I/O requests are blocked or permitted in accordance with volume prioritization settings 354 or merged prioritization settings 358.

As a result, with the mechanisms of the illustrative embodiments, during normal modes of operation, the secondary storage system is permitted to allocated resources to local workloads, thereby increasing the utilization of the resources of the secondary storage system. Moreover, the mechanisms of the illustrative embodiments allow for prioritization of workloads during failover modes of operation such that primary workloads of the primary site are prioritized over the local workloads of the secondary site. This may involve blocking all I/O requests from local workloads or allocating resources to local workloads based on assigned priorities and priority settings that provide preference to primary workloads over all local workloads.

Figure 4:
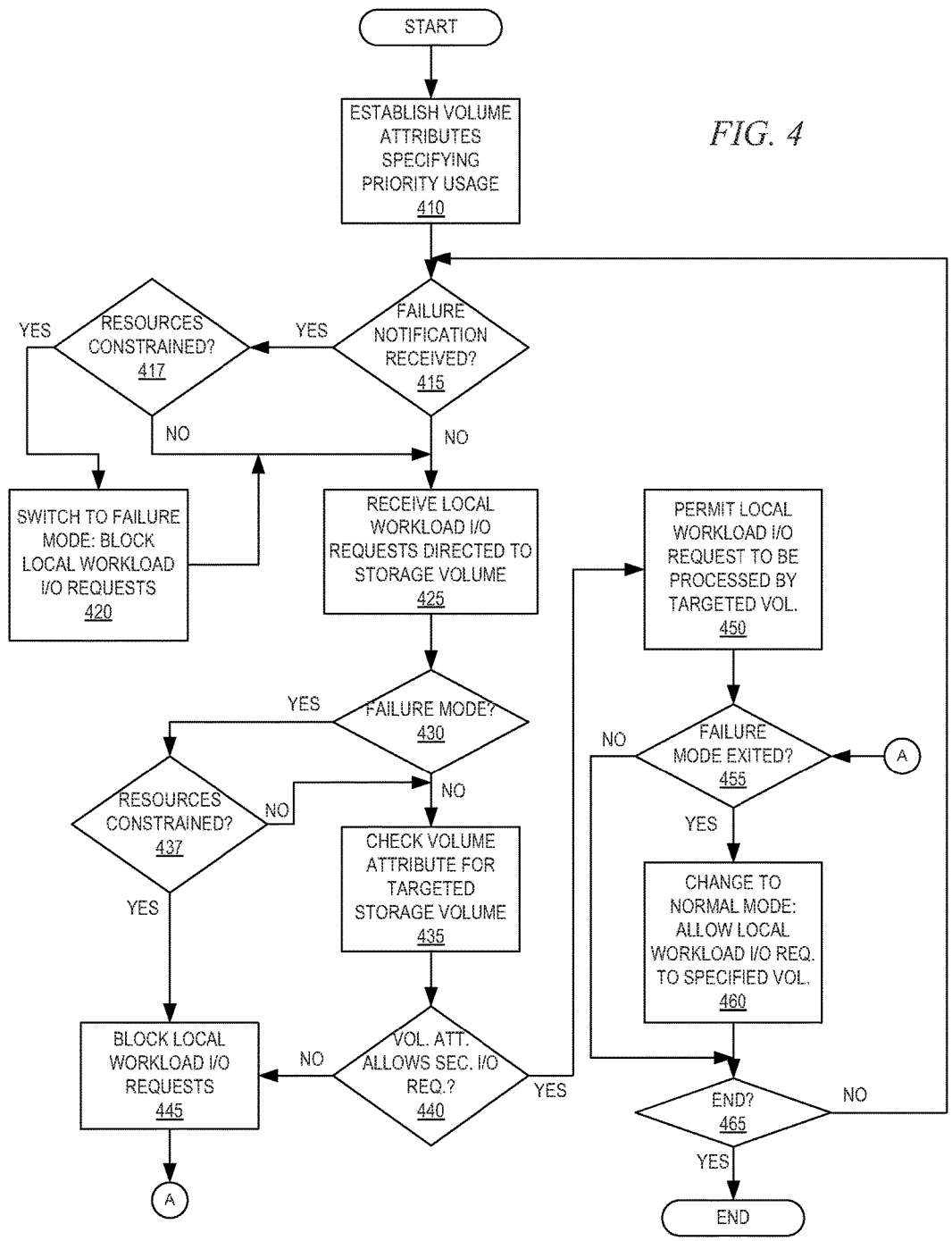
FIG. 4 is a flowchart outlining an example operation for implementing a failover mechanism in accordance with one illustrative embodiment.

FIG. 4 is a flowchart outlining an example operation for implementing a failover mechanism in accordance with one illustrative embodiment. The operation outlined in FIG. 4 may be implemented in a storage controller of a secondary storage system, for example.

As shown in FIG. 4, the operation starts with establishing volume attributes specifying priorities of workloads that are able to access the various volumes (step 410). A determination is made as to whether a failure notification has been received from the first site (step 415). If a failure notification has been received, then a determination is made as to whether the resources are constrained or not, i.e. determining if local access to the resources in response to a failure of a primary site are to be constrained based on priority (step 417). If the resources are constrained, then the mode of operation of the second site is switched to a failure mode in which secondary workload I/O requests are blocked (step 420). Thereafter, if the resources are not constrained, or if the failure notification has not been received, then secondary workload I/O requests directed to storage volumes are received (step 425).

A determination is made as to whether the second site is currently operating in a failure mode of operation (step 430). If so, then a determination is made as to whether the resources are constrained (step 437). If so, then the secondary workload I/O requests are blocked (step 445). If the determination is that the second site is not currently working in a failure mode of operation, or if the resources are not constrained, then the volume attribute for the targeted storage volume is checked (step 435) and a determination is made as to whether the volume attribute allows secondary I/O requests to be processed for the targeted volume (step 440). If not, then the secondary workload I/O request is blocked (step 445). If so, then the secondary workload I/O request is permitted to be processed by the targeted volume (step 450).

A determination is made as to whether the failure mode has been exited (step 455). If so, then the mode of operation of the secondary site is changed to a normal mode of operation in which secondary workload I/O requests are allowed to specified volumes (step 460). Thereafter, or if the failure mode has not been exited, then a determination is made as to whether operation of the illustrative embodiment s to be exited (step 465). If not, the operation returns to step 415. Otherwise, the operation terminates.

Figure 5:
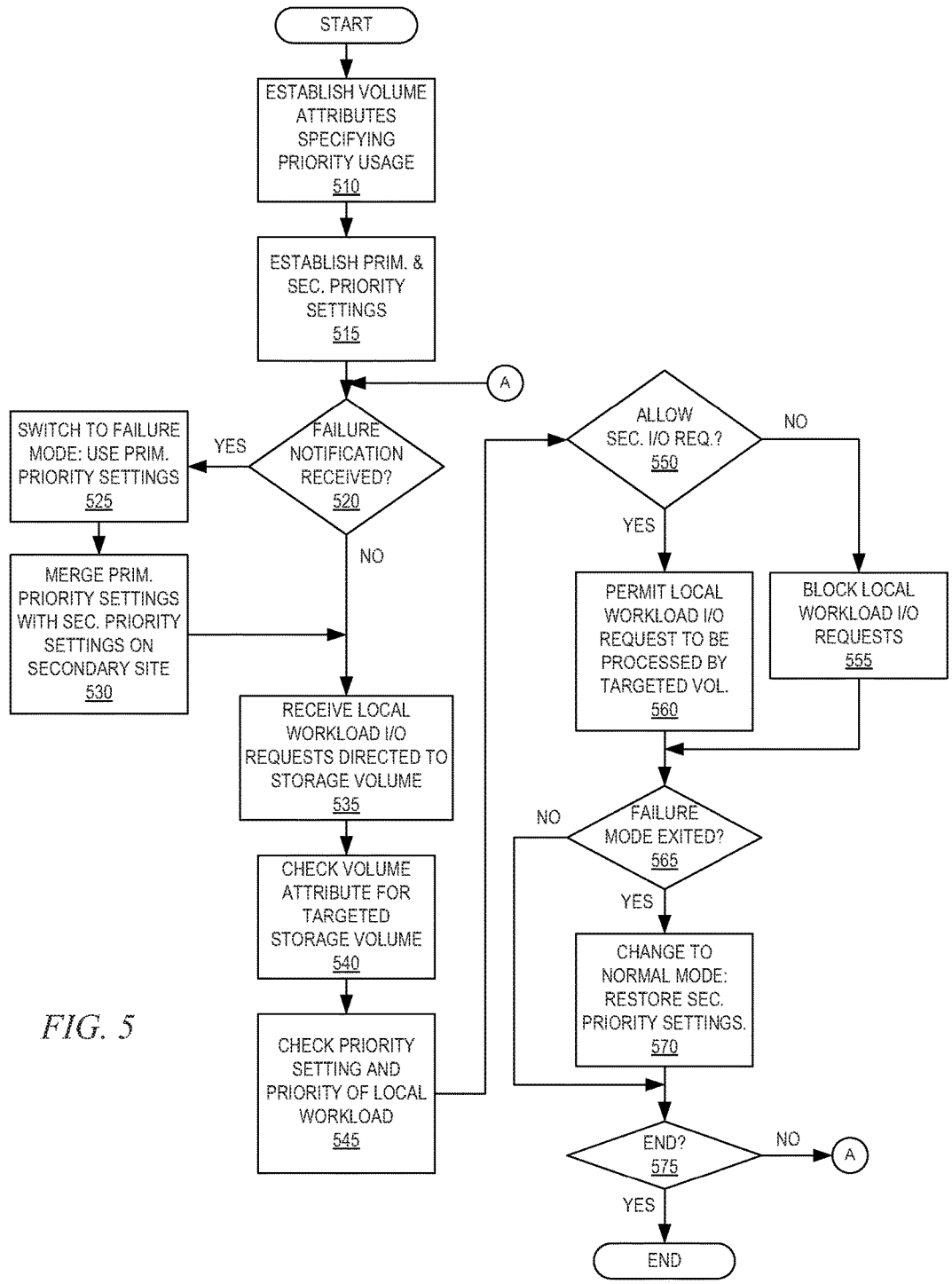
FIG. 5 is a flowchart outlining an example operation for implementing failover mechanism in accordance with another illustrative embodiment.

FIG. 5 is a flowchart outlining an example operation for implementing a failover mechanism in accordance with another illustrative embodiment. As shown in FIG. 5, the operation starts by establishing volume attributes specifying priorities of workloads that are able to access the various volumes (step 510). Primary and secondary priority settings are established for the storage systems of the first and second sites step 515). A determination is made as to whether a failure notification has been received from the first site (step 520). If a failure notification has been received, then the mode of operation of the second site is switched to a failure mode in which priority settings of the first site are used in the second site step 525). The first site priority settings are merged with the secondary priority settings on the second site (step 530). Thereafter, or if the failure notification has not been received, then secondary workload I/O requests directed to storage volumes are received (step 535).

In response to receiving the secondary workload I/O requests, a check of the volume attributes for the targeted storage volume is performed (step 540). A check of the priority settings and the priority of the secondary workload is performed (step 545). A determination is made as to whether the I/O request from the secondary workload should be allowed (step 550). If not, the secondary workload I/O request are blocked (step 555). If the I/O request from the secondary workload should be allowed, the secondary workload I/O request is permitted to be processed by the targeted volume (step 560).

Thereafter, a determination is made as to whether the failure mode has been exited (step 665). Thereafter, if so, then the mode of operation is changed to a normal mode of operation and the original security settings of the secondary storage system are restored (step 570). A determination is made as to whether the operation should be ended or not (step 575). If no, then the operation returns to step 520. Otherwise, the operation terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a storage system controller and a secondary storage system, for controlling access to storage volumes on the secondary storage system, comprising:
   associating priority values with a plurality of logical volumes in the secondary storage system, wherein each logical volume has an associated volume attribute specifying whether the corresponding logical volume may be accessed by local workloads during the normal mode of operation;

associating second site priority values with one or more workloads in the local workloads;

determining, by the storage system controller, whether a first site computing device has sent a notification of a failure condition of a first site; and in response to a determination that the notification of the failure condition of the first site has been received, modifying, by the storage system controller, a mode of operation of the second site from a normal mode of operation to a failure mode of operation, wherein in the failure mode of operation, the storage system controller of the second site blocks requests from the one or more workloads in the local workloads having an associated second site priority value lower than a priority value associated with a logical volume targeted by the requests.

2. The method of claim 1, wherein, in response to a failure condition of the first site occurring, a primary workload of the first site computing device is transitioned to the second site such that the primary workload accesses the secondary storage system during the failover mode of operation rather than a primary storage system associated with the first site.

3. The method of claim 1, further comprising in response to a determination that the notification of the failure condition of the first site has not been received, permitting, by the storage system controller, local workloads of a second site computing device to access storage volumes on the secondary storage system in the normal mode of operation.

4. The method of claim 3, wherein at least one first logical volume in the plurality of logical volumes has a corresponding volume attribute specifying that the at least one logical volume cannot be accessed by local workloads during the normal mode of operation, and wherein at least one second logical volume in the plurality of logical volumes has a corresponding volume attribute specifying that the at least one logical volume can be accessed by local workloads during the normal mode of operation.

5. The method of claim 1, wherein, in the failure mode of operation, the storage system controller blocks all requests from local workloads directed to all logical volumes of the secondary storage system.

6. The method of claim 1, wherein modifying, by the storage system controller, a mode of operation of the second site from a normal mode of operation to a failure mode of operation comprises obtaining first site priority values for at least one of workloads or logical volumes from the first site and integrating the first site priority values into the second site priority values.

7. The method of claim 6, wherein integrating the first site priority values comprises merging the first site priority values with the second site priority values to generate merged priority values, and applying the merged priority values to requests from the local workloads to determine which, if any, requests from workloads in the local workloads to block.

8. The method of claim 6, wherein integrating the first site priority values comprises replacing the second site priority values with the first site priority values and applying the first site priority values to requests from the local workloads to determine which, if any requests from workloads in the local workloads to block.

9. The method of claim 1, further comprising:

determining, by the storage system controller, whether a first site computing device has sent a notification of a discontinuation of a failure condition of the first site; and in response to a notification of a discontinuation of a failure condition of the first site being received by the storage system controller, discontinuing the blocking of at least a portion of the requests from local workloads of the second site computing device.

10. A computer program product comprising a non-transitory computer readable storage medium having a computer readable program stored therein, wherein the computer readable program, when executed on a storage system controller associated with a second site in a replication pair comprising a first site and the second site, causes the storage system controller to:

associate priority values with a plurality of logical volumes in the secondary storage system, wherein each logical volume has an associated volume attribute specifying whether the corresponding logical volume may be accessed by local workloads during the normal mode of operation;

associate second site priority values with one or more workloads in the local workloads;

determine whether a first site computing device has sent a notification of a failure condition of a first site; and in response to a determination that the notification of the failure condition of the first site has been received, modifying a mode of operation of the second site from a normal mode of operation to a failure mode of operation, wherein in the failure mode of operation, the storage system controller blocks requests from the one or more workloads in the local workloads having an associated second site priority value lower than a priority value associated with a logical volume targeted by the requests.

11. The computer program product of claim 10, wherein, in response to a failure condition of the first site occurring, a primary workload of the first site computing device is transitioned to the second site such that the primary workload accesses the secondary storage system during the failover mode of operation rather than a primary storage system associated with the first site.

12. The computer program product of claim 10, wherein in response to a determination that the notification of the failure condition of the first site has not been received, the storage system controller permits local workloads of a second site computing device to access storage volumes on the secondary storage system in the normal mode of operation.

13. The computer program product of claim 12, wherein at least one first logical volume in the plurality of logical volumes has a corresponding volume attribute specifying that the at least one logical volume cannot be accessed by local workloads during the normal mode of operation, and wherein at least one second logical volume in the plurality of logical volumes has a corresponding volume attribute specifying that the at least one logical volume can be accessed by local workloads during the normal mode of operation.

14. The computer program product of claim 10, wherein, in the failure mode of operation, the storage system controller blocks all requests from local workloads directed to all logical volumes of the secondary storage system.

15. The computer program product of claim 10, wherein modifying, by the storage system controller, a mode of operation of the second site from a normal mode of operation to a failure mode of operation comprises obtaining first site priority values for at least one of workloads or logical volumes from the first site and integrating the first site priority values into the second site priority values.

16. The computer program product of claim 15, wherein integrating the first site priority values comprises merging the first site priority values with the second site priority values to generate merged priority values, and applying the merged priority values to requests from the local workloads to determine which, if any, requests from workloads in the local workloads to block.

17. The computer program product of claim 15, wherein integrating the first site priority values comprises replacing the second site priority values with the first site priority values and applying the first site priority values to requests from the local workloads to determine which, if any requests from workloads in the local workloads to block.

18. The computer program product of claim 10, wherein the computer readable program further causes the storage system controller to:
  determine whether a first site computing device has sent a notification of a discontinuation of a failure condition of the first site; and
  in response to a notification of a discontinuation of a failure condition of the first site being received by the storage system controller, discontinuing the blocking of at least a portion of the requests from local workloads of the second site computing device.

19. An apparatus, comprising:
  a storage controller of a secondary storage system in a second site in a replication pair comprising a first site and the second site; and
  a memory coupled to the processor, wherein the memory comprises instructions which, when executed by the storage controller, cause the storage controller to:
  associate priority values with a plurality of logical volumes in the secondary storage system, wherein each logical volume has an associated volume attribute specifying whether the corresponding logical volume may be accessed by local workloads during the normal mode of operation;
  associate second site priority values with one or more workloads in the local workloads;
  determine whether a first site computing device has sent a notification of a failure condition of the first site; and
  in response to a determination that the notification of the failure condition of the first site has been received, modifying a mode of operation of the second site from a normal mode of operation to a failure mode of operation, wherein in the failure mode of operation, the storage controller blocks requests from the one or more workloads in the local workloads having an associated second site priority value lower than a priority value associated with a logical volume targeted by the requests.

20. The apparatus of claim 19, wherein modifying, by the storage system controller, a mode of operation of the second site from a normal mode of operation to a failure mode of operation comprises obtaining first site priority values for at least one of workloads or logical volumes from the first site and integrating the first site priority values into the second site priority values.

* * * * *